United States Patent [19]

Heidjann et al.

[11] Patent Number: 5,024,631
[45] Date of Patent: Jun. 18, 1991

[54] COMBINE HARVESTER

[75] Inventors: Franz Heidjann, Harsewinkel; Karl-Josef Kleingraeber, Muenster, both of Fed. Rep. of Germany

[73] Assignee: Claas OHG, Harsewinkel, Fed. Rep. of Germany

[21] Appl. No.: 513,487

[22] Filed: Apr. 23, 1990

[30] Foreign Application Priority Data

May 6, 1989 [DE] Fed. Rep. of Germany ....... 3914962

[51] Int. Cl.⁵ ...................... A01F 12/26; A01F 12/28
[52] U.S. Cl. .......................................... 460/75; 460/109
[58] Field of Search ....................... 460/66, 69, 72, 75, 460/76, 77, 107, 108, 109; 56/14.6, DIG. 5

[56]    References Cited
U.S. PATENT DOCUMENTS

| | | | |
|---|---|---|---|
| 1,099,070 | 6/1914 | McConnell | 460/109 |
| 1,992,172 | 2/1935 | Anderson | 460/75 |
| 2,577,329 | 12/1951 | Irvine | 460/109 |
| 3,470,881 | 10/1969 | Knapp et al. | 460/109 |
| 3,481,344 | 12/1969 | Stokland | 460/81 |
| 3,568,682 | 3/1971 | Knapp et al. | 460/108 |
| 4,499,908 | 2/1985 | Niehaus | 460/108 |
| 4,774,968 | 10/1988 | Spanlang | 460/109 |

FOREIGN PATENT DOCUMENTS

| | | |
|---|---|---|
| 385171 | 2/1988 | Austria . |
| 1287843 | 10/1969 | Fed. Rep. of Germany . |
| 2045070 | 12/1971 | Fed. Rep. of Germany . |
| 2235153 | 2/1973 | Fed. Rep. of Germany . |
| 2107810 | 5/1972 | France . |

Primary Examiner—George A. Suchfield
Attorney, Agent, or Firm—Spencer & Frank

[57]    ABSTRACT

In a combine harvester having a tangential-flow threshing unit installed transversely to the direction of travel and comprising a drum (6) and a concave which has a frame (14) and a removable sieve lining (25), an inclined conveyor (3) protruding into the threshing unit housing through the front wall (1) of the latter and an opening in this wall (1) being arranged above the inclined conveyor (3), it is proposed, in order to facilitate the installation and removal of the sieve lining (25), that the said sieve lining be divided into a plurality of longitudinally abutting lining sections which are supported at the butt joints by arcuate webs and that the sieve lining (25) and the frame (14) be designed in such a way that the sieve lining (25) is removable in the circumferential direction from the frame (14) and can be removed through the opening in the wall (1) without dismounting the inclined conveyor (3). Particularly expedient embodiment features are given for a frame (14) having, in particular, a three-part sieve lining (cf. drawing).

7 Claims, 5 Drawing Sheets

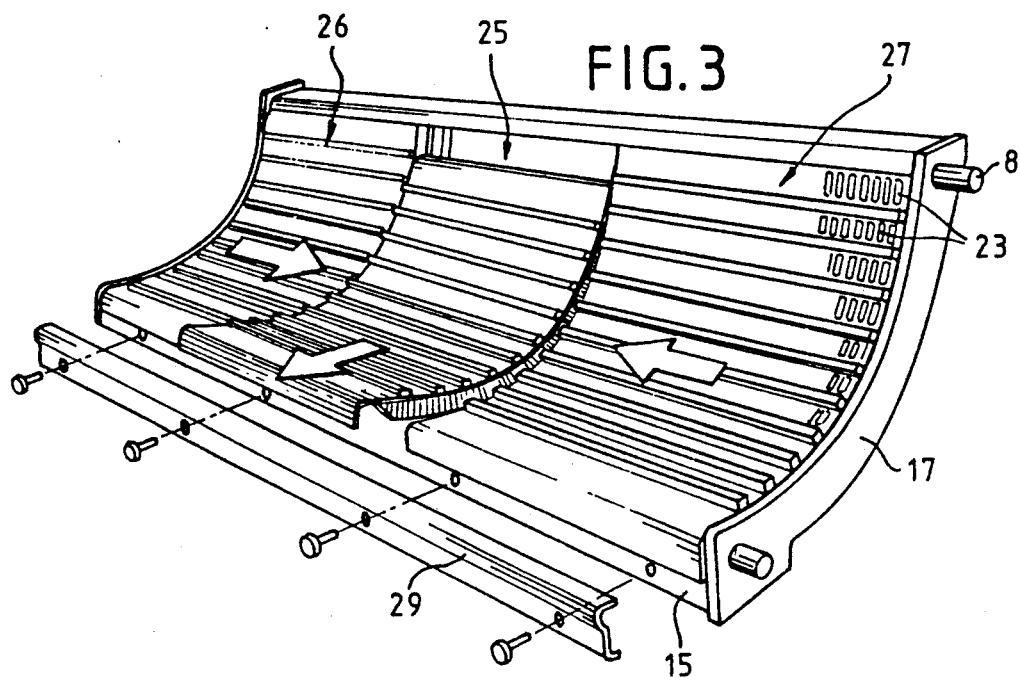
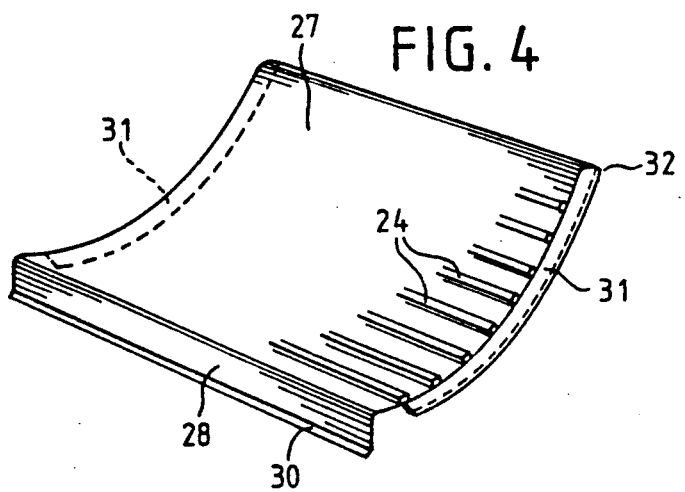

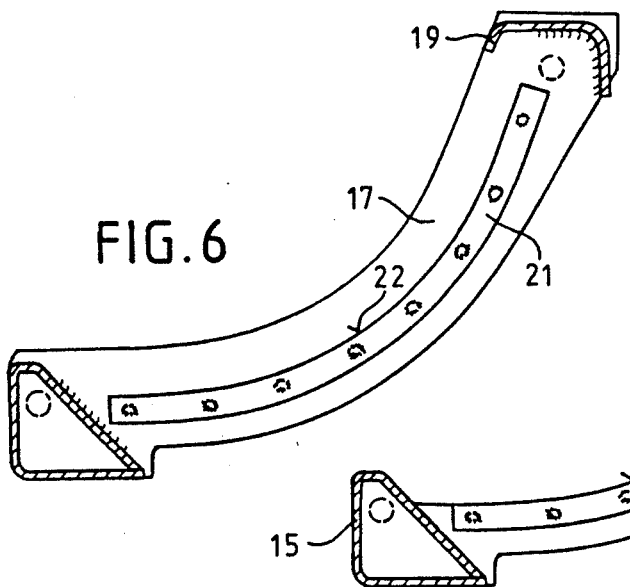
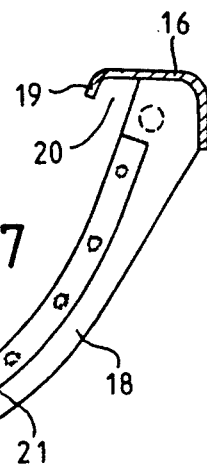
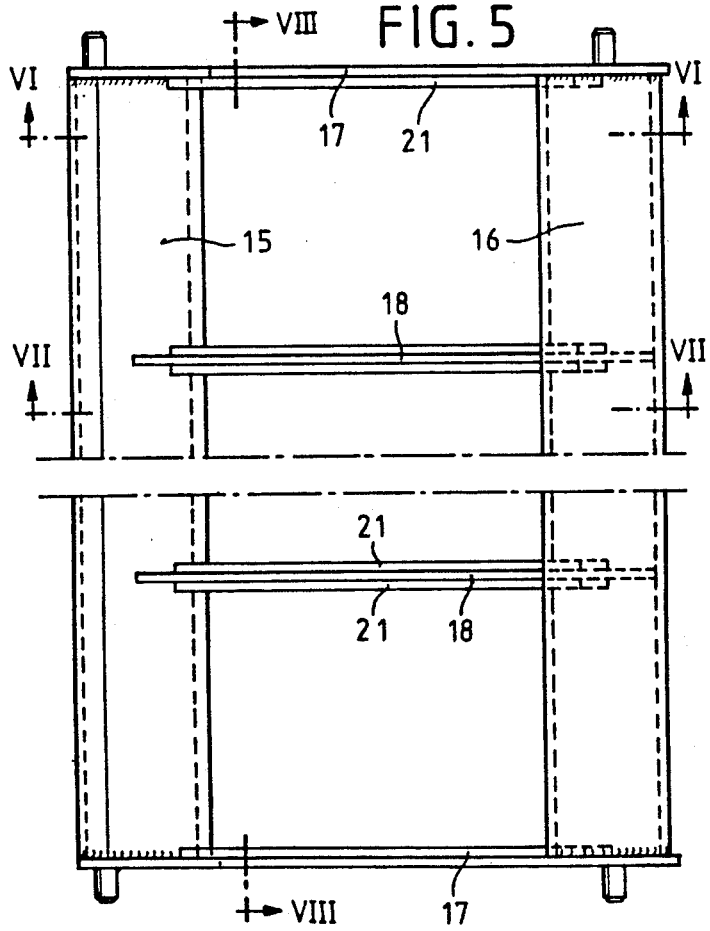
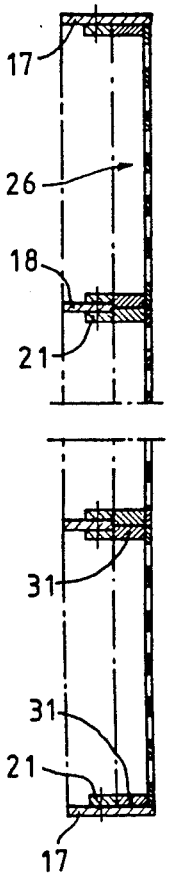

COMBINE HARVESTER

BACKGROUND OF THE INVENTION

The invention relates to a combine harvester having a threshing unit housing, a tangential-flow threshing unit installed transversely to the direction of travel and comprising a drum and a concave, an inclined conveyor entering the threshing unit housing and an inspection flap arranged in the front wall of the threshing unit housing above the inclined conveyor, the concave surrounding the drum over an arc having a sieve lining and a frame supporting the latter and comprising two longitudinal strips and two arcuate end strips. The arrangement of the threshing unit in a combine harvester of this kind is known from German Patent 1,287,843.

In this and in present-day combine harvesters having a correspondingly installed tangential-flow threshing unit, the concave can only be replaced or serviced if the cutting unit, including the inclined conveyor, is detached from the threshing unit housing, freeing access to the concave through the inlet opening for the material to be threshed. The outlay in terms of assembly is thus considerable.

SUMMARY OF THE INVENTION

The object on which the invention is based is to find a means of removing the concave in such machines which is in comparison simpler.

This object is achieved, according to the invention, starting from a combine harvester of the type described at the outset, by the fact that the sieve lining is divided into a plurality of longitudinally abutting lining sections which are supported at the butt joints by arcuate webs of the frame and are designed so as to be removable from the frame in the circumferential direction and are accessible and removable through the opened inspection flap. As a result the cutting unit and the inclined conveyor do not need to be removed. Rather, to carry out the necessary work or to replace the entire sieve lining, only the inspection flap needs to be opened and/or removed, this saving a considerable amount of time.

Admittedly, it has already been disclosed in German Auslegeschrift 2,045,070, in the case of a combine harvester having a threshing device operating with longitudinal flow, to form the sieve lining described there as bottom sieve from a plurality of separate part-sections which can be handled independently and can be introduced, hooked in and displaced in the direction of the drum axis through an opening made in the side of the machine. There, however, the individual part-sections are attached to the frame of the concave from below and folded upwards The part-sections are thus not supported from below in the region of their abutting edges. In the case of transversely installed threshing devices of the type described at the outset, the attachment and replacement even of a divided sieve lining is not possible from below In addition, the absence of support for the lining sections at the abutting end edges is felt to be a disadvantage.

As seen from the inspection flap, the concave is virtually on the opposite side of the drum in a combine harvester of the generic type. The distance between the drum and the inclined conveyor or the front wall of the threshing unit housing is small. It is therefore of particular importance to make the lining sections removable in the circumferential direction from the frame after the concave has been lowered into its lowermost position, so that they can be raised around the drum, moved upwards through the intermediate space between drum and inclined conveyor and removed through the inspection flap.

A further handicap consists in the fact that, even in the case of a divided sieve lining, the lining sections at the outer sides cannot be lifted out simply in this way because the front parts of the side walls of the inclined conveyor protrude into the said intermediate space. It is therefore proposed that at least three lining sections are provided, of which, after the removal of the central lining section, the remainder can be displaced in the direction of the longitudinal strips into the central position and can then be removed from there.

As regards the structural design of the concave and the firm but easily releasable holding of the lining sections in the frame, it is on the one hand proposed that the rear longitudinal strip of the frame in the direction of travel has a bend pointing in the circumferential direction and fitting over the rear edges of the lining sections. This makes it possible to pull the lining sections tangentially out of the pocket of the rear longitudinal strip, the said pocket being formed by the bend. It is, on the other hand, proposed, as a particularly expedient embodiment, that the lining sections rest by their front edges on the front longitudinal strip of the frame in such a way that they can be lifted off upwards, and fit over this longitudinal strip at the front by means of a radial bend. During removal, the linings are thus not rotated out exactly following their surface of curvature but can be simultaneously raised at the front and are thus easily guided into the abovementioned intermediate space between the drum and the inclined conveyor.

The lining sections are secured by the fact that the front radial bends are pressed against the front face of the front longitudinal strip of the frame by means of a clamping strip or the like, projecting edge parts of the bends hooking up with the clamping strip. The clamping thus effected with the aid of a few screws on the one hand presses the lining sections backwards, with the result that the rear edges are held in the pockets of the rear longitudinal strip of the frame, and pulls the front edges downwards so that the linings cannot lift from the frame.

At each side, the individual lining sections have a downward-pointing bend or bent end strip which rests against the end strip of an adjoining lining section or against an end strip of the frame When all the lining sections have been inserted, their movement in the direction of the drum axis is thereby prevented. Careful support and guidance from below is also important For this purpose, supporting strips, the supporting surfaces of which, together with the supporting surfaces of the webs, lie in a common curved surface parallel to the sieve surface and support the lining sections at their end bends, are attached to the inner side of the end strips of the frame The webs, which extend transversely in an arc from one longitudinal strip of the frame to the other longitudinal strip, should have a sufficiently wide supporting surface since, as the lining section in each case lying in the middle is pulled out, said lining section slides and is guided by the rear corners of its end strips or the supporting surfaces of the webs.

Everything which has been stated in connection with the removal of the lining sections in terms of advantages and explanations applies, of course, also to the guiding in or insertion of the lining sections. It is precisely here that the action of the webs as skids for the lining section to be guided in the circumferential direction is of particular importance. From the central position in the frame, the lining sections are then pushed into their lateral positions and the missing central section is finally inserted An illustrative embodiment of the invention is explained below with reference to the drawing, in which, specifically

BRIEF DESCRIPTION OF THE DRAWINGS

FIG. 3 shows a three-dimensional representation of the concave with the clamping released, FIG. 4 shows a three-dimensional representation of an individual lining section, FIG. 5 shows a shortened plan view of the frame of the concave according to FIG. 3, FIG. 6 shows a cross-section VI—VI of the frame according to FIG. 5 to illustrate an end strip, FIG. 7 shows a cross-section VII—VII of the frame to illustrate a web, FIG. 8 shows a longitudinal section VIII—VIII of the frame end of the lining sections not shown in FIG. 5

DESCRIPTION OF THE PREFERRED EMBODIMENTS

Figure 1:
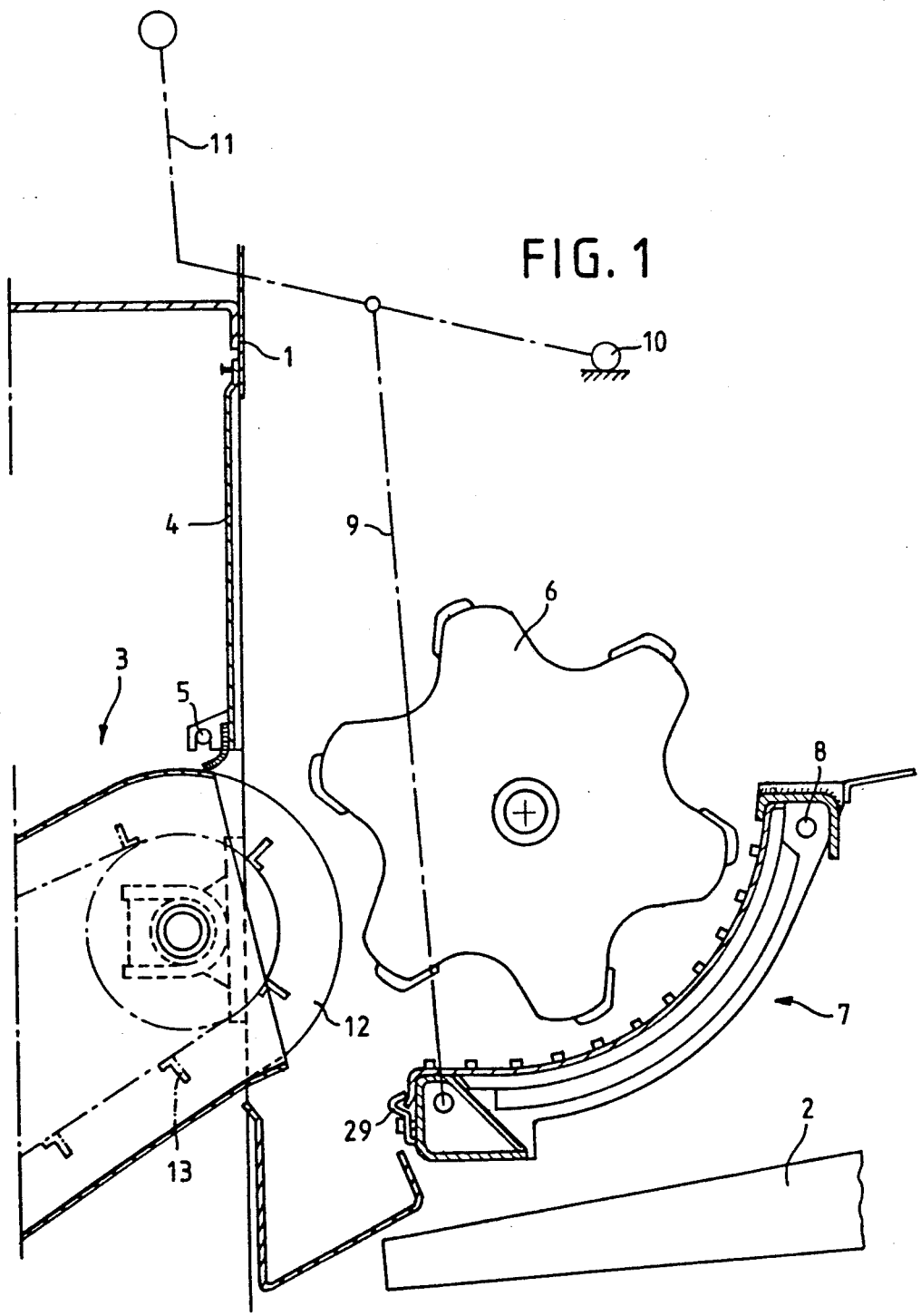
FIG. 1 shows a vertical section of the threshing unit and of the upper end portion of the inclined conveyor of a combine harvester in the operating position.

FIG. 1 shows, in a combine harvester, the front wall 1 of the threshing unit housing, part of the cleaning device 2, the inclined conveyor 3 entering via the front wall and an inspection flap 4 arranged above said inclined conveyor. Said inspection flap is suspended at the bottom in two lateral studs 5 and sealed with respect to the cover wall of the inclined conveyor 3 by means of a sealing strip. The threshing drum 6, the axis of which runs transversely to the direction of travel, is situated in the threshing unit housing. A curved concave 7, which is mounted so as to be swivellable about pivots 8 arranged in its rear edge region and parallel to the drum axis and can be swivelled up and down by means of two schematically represented connecting rods 9 engaging in its front region, extends approximately over the lower right-hand quadrant of the drum circumference. The connecting rods 9 are articulated on an actuating lever 11 mounted at 10.

Figure 9:
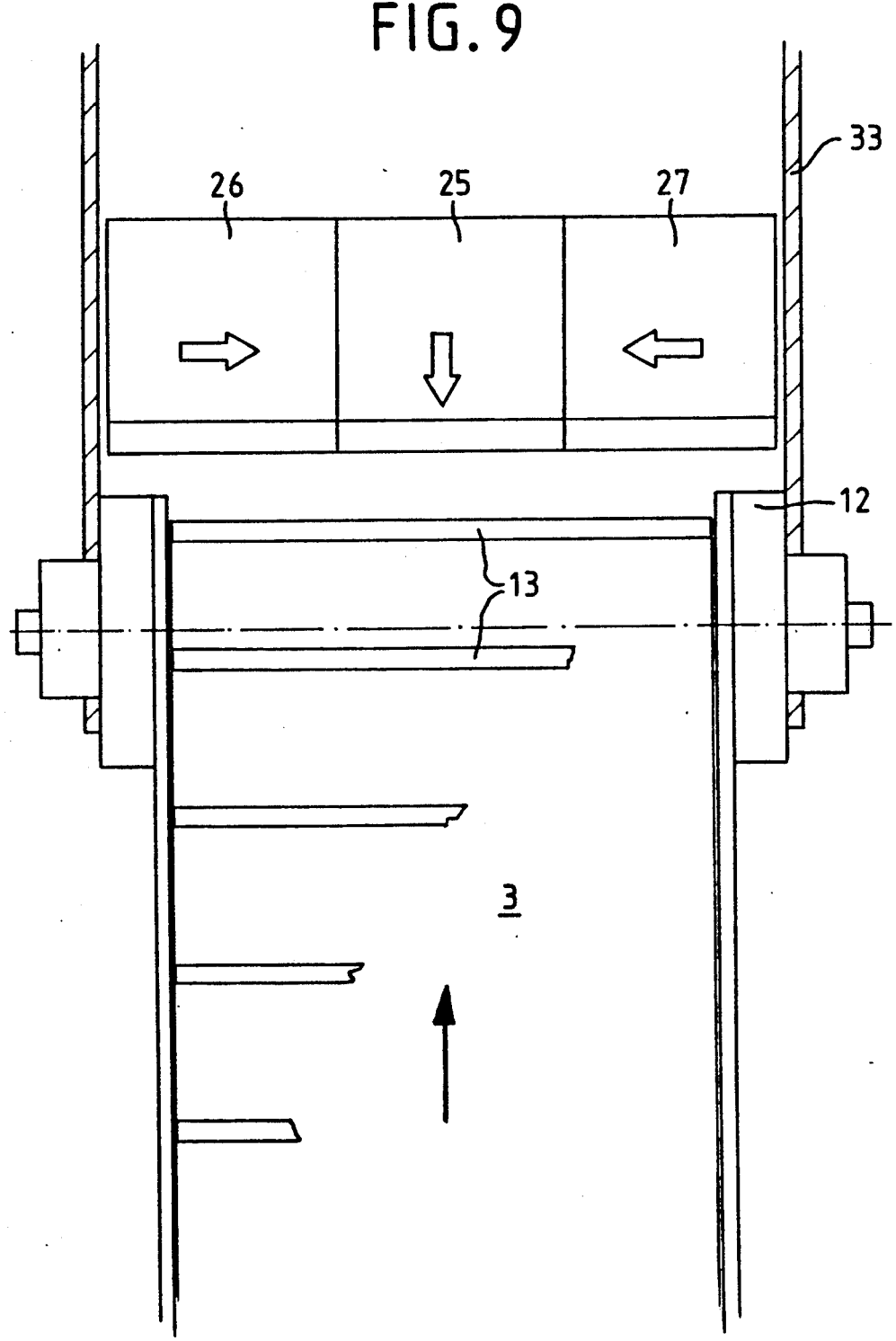
FIG. 9 shows a schematic plan view of the arrangement according to FIG. 1, without the threshing drum.

As can be seen from FIG. 9, the inclined conveyor 3 does not extend over the entire width of the threshing unit housing, the sidewalls of which are designated by 33. Rather, the forward lateral parts 12 of the inclined conveyor 3, which also include the bearings for the turn-around of the chain-guided conveying slats 13, protrude into the threshing unit housing For this reason, only a central portion of the overall width of the threshing unit is available for the removal of the lining of the concave.

The concave 7 is described in detail below with reference to FIGS. 3 to 8. Its frame (FIG. 5) comprises a front longitudinal strip 15, a rear longitudinal strip 16, two end strips 17 and two webs 18 arranged between the latter and likewise transversely connecting the longitudinal strips to each other. The front longitudinal strip 15 has an approximately triangular hollow cross-section approximately vertical at the front and falling away obliquely towards the rear, the upper edge, as supporting surface, being blunted. The rear longitudinal strip 16 has an angular cross-section, the upper horizontal leg projecting forwards and being bent downwards at its edge approximately tangentially to the arc surface and to the drum. This bend 19 forms a pocket 20 for accommodating the lining sections still to be described. The arcuate end strips 17, which are welded to the longitudinal strips, have narrower arcuate supporting strips 21 spot-welded on at their inner sides. These supporting strips 21 also appear on each of the two sides of the narrower webs 18. This results in supporting shoulders at the end strips 17, the supporting surfaces 22 (FIG. 6) of said supporting shoulders lying in a common curved surface with the widened common supporting surface 22 of the webs.(FIG. 7). Attached to the outside of the end strips are the bearing journals 8 and two further journals on which the connecting rods 9 engage.

As is customary, the sieve lining is provided with sieve openings 23 and longitudinal slats 24 and divided into three individual lining sections 25 to 27, which can also be of different lengths. Lining sections 25 to 27 have respective butt joints and are supported at the butt joints by arcuate webs 18. The shape of a lining section, e.g. 27, is apparent in particular from FIGS. 1 (cross-section) and 4. The actual sieve surface is curved and bent downwards at the rear and front edge. Together with the shorter rear bend, the lining section fits into the pocket 20 of the rear longitudinal strip 16. The somewhat broader front bend 28 fits over the front longitudinal strip of the frame and is releasably secured by means of a clamping strip 29 screwed to the front face of said longitudinal strip. The outermost edge strip 30 of the bend 28 is bent again slightly in order to hook into the clamping strip 29 and prevent the lifting of the lining section. Arcuate end strips 31 which rest on the above-mentioned supporting surfaces 22 of the supporting strips 21 and of the webs 18 are attached to the end edges of the lining sections. In particular, the rear corners 32 of the end strips can slide on the supporting surfaces 22 during installation and removal.

Figure 2:
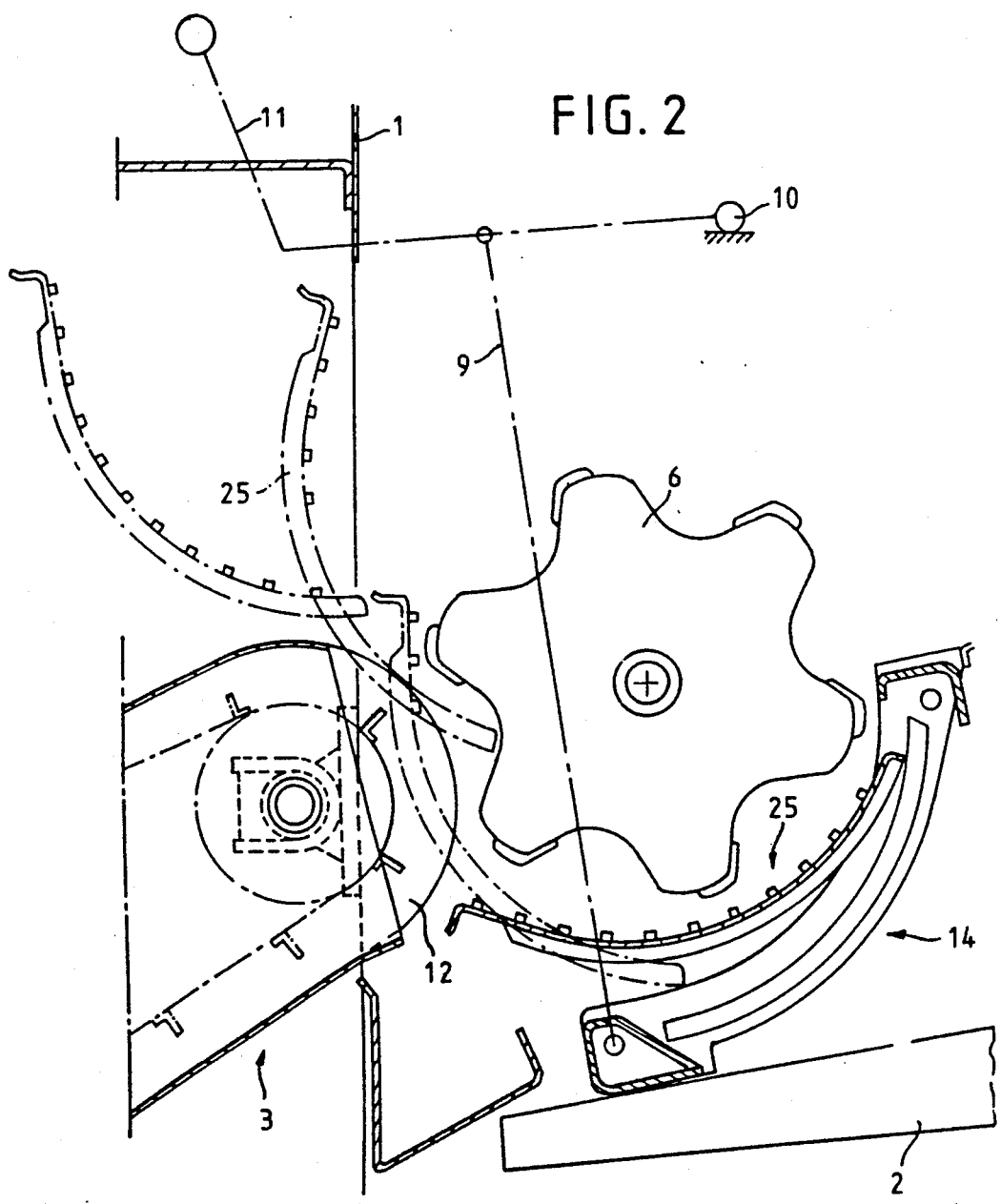
FIG. 2 shows the arrangement as in FIG. 1, but with the frame of the concave lowered and various intermediate positions of a lining section.

To remove the lining sections 25 to 27, the inspection flap 4 is first of all removed and the clamping strip 29 released Furthermore, the concave must be swivelled into its lowermost position by means of the actuating lever 11, as FIG. 2 shows. As indicated in FIG. 3, the central lining section 25 is now raised at the front, pulled around the drum 6 and removed through the inspection opening, as shown in FIG. 2 by means of several intermediate stages represented by chain lines. Because of the protruding parts 12 of the inclined conveyor, the lateral lining sections 26 and 27 cannot be removed directly As indicated by arrows in FIG. 3, they are therefore pushed to the center on the frame 14, one after the other, and then removed like the lining 25. Insertion is effected in the reverse order, it being possible to bring the lining sections unproblematically and rapidly into their correct operating position and fix them securely.

We claim:

1. A combine harvester having a threshing unit housing, a tangential-flow threshing unit installed transversely to the direction of travel and comprising a drum and a concave, an inclined conveyor entering the threshing unit housing and an inspection flap arranged in the front wall of the threshing unit housing above the inclined conveyor, the concave surrounding the drum over an arc having a sieve lining and a frame supporting the latter and comprising two longitudinal strips and two arcuate end strips, wherein the sieve lining is divided into a plurality of longitudinally abutting lining sections (25, 26, 27) having respective butt joints and which are supported at the butt joints by arcuate webs (18) of the frame (14) and are designed so as to be removable from the frame (14) in the circumferential direction and are accessible and removable through the opened inspection flap (4).

2. A combine harvester as claimed in claim 1, wherein at least three lining sections are provided, of which, after the removal of the central lining section (25), the remainder (26, 27) can be displaced in the direction of the longitudinal strips (15, 16) into the central position.

3. A combine harvester as claimed in claim 1, wherein the rear longitudinal strip (16) of the frame in the direction of travel has a bend (19) pointing in the circumferential direction and fitting over the rear edges of the lining sections (25, 26, 27).

4. A combine harvester as claimed in claim 3, wherein the lining sections (25, 26, 27) rest by their front edges on the front longitudinal strip (15) of the frame in such a way that they can be lifted off upwards, and fit over this longitudinal strip at the front by means of a radial bend (28).

5. A combine harvester as claimed in claim 4, wherein the radial bends (28) are pressed against the front face of the front longitudinal strips (15) by means of a clamping strip (29) or the like, projecting edge parts (30) of the bends (28) hooking up with the clamping strips (29).

6. A combine harvester as claimed in claim 1, wherein, at each side, the individual lining section has a downward-pointing bend or arcuate end strip (31) which rests against the end strip of an adjoining lining section or against an end strip (17) of the frame.

7. A combine harvester as claimed in claim 1, wherein supporting strips (21), the supporting surfaces (22) of which, together with the supporting surfaces (22) of the webs (18), lie in a common curved surface parallel to the sieve surface and support the lining sections at their end strips (31), are attached to the inner side of the end strips (17) of the frame.

* * * * *